Oct. 27, 1964 O. M. ENESS 3,154,740
AUTOMATIC GAIN CONTROL SYSTEM UTILIZING A NETWORK CONTAINING
A SHORT TIME CONSTANT AND A LONG TIME CONSTANT
Filed Sept. 6, 1960

INVENTOR.
Orville M. Eness
BY Mueller & Aichele
Attys.

United States Patent Office 3,154,740

Patented Oct. 27, 1964

3,154,740

AUTOMATIC GAIN CONTROL SYSTEM UTILIZING A NETWORK CONTAINING A SHORT TIME CONSTANT AND A LONG TIME CONSTANT

Orville M. Eness, Norridge, Ill., assignor to Motorola, Inc., Chicago, Ill., a corporation of Illinois Filed Sept. 6, 1960, Ser. No. 53,949
6 Claims. (Cl. 325—319)

Figure 1:
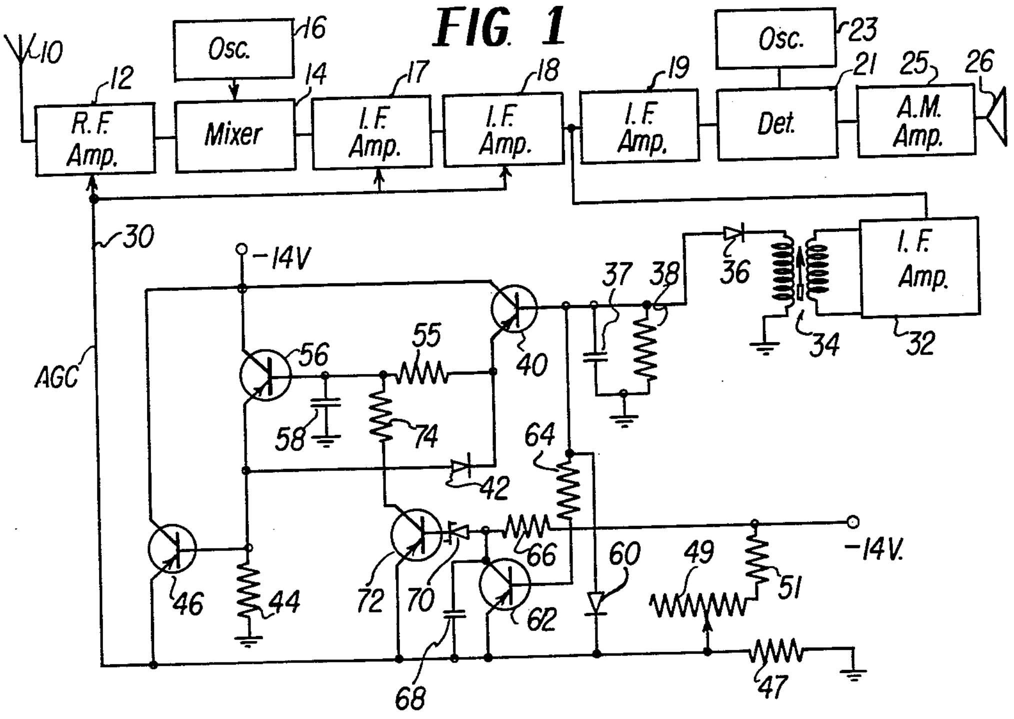

This invention relates to signal amplifying systems and more particularly to an automatic gain control circuit especially useful in suppressed carrier single sideband radio receivers.

Various types of signal amplifiers, particularly those used in radio receivers, incorporate means for automatically regulating the amplification or gain thereof as a function of the applied signal level in order to maintain a relatively constant output from the amplifier. In, for example, radio or television receivers, such control can be accomplished by varying the gain of one or more amplifiers in the receiver as a function of the strength of the received carrier wave. In suppressed carrier single sideband systems however, there is no carrier suitable for this purpose. The signal that is present in such a system, for example, may be the sideband modulation components representing spoken syllables comprising a voice message of words and sentences. These signal components will have respective amplitudes representative of the signal strength but additionally such components will appear and disappear at various intervals so that during some periods no signal will be transmitted. Therefore, a timing aspect is introduced into the consideration of gain control in such a suppressed carrier single sideband signal due to the gaps between words or sentences.

In an AGC system suitable for two-way voice communication by means of suppressed carrier signals both the "attack" time of the AGC circuit and the "decay" time of the circuit must be properly established for satisfactory operation. If the attack time, or time for initial response of the AGC circuit to the appearance of a signal, is too fast, the AGC level may respond to impulse noise thereby controlling the gain of the receiver by this noise. Furthermore, the audio output of a receiver may make a thumping noise when the AGC level is increased at a rapid rate as the signal initially develops. Moreover, if the attack time is too slow the receiver may be overdriven, and audio distortion may result, prior to the development of a sufficient AGC control voltage. Considering now the decay, or persistence considerations, it may be seen that the AGC control signal must persist between words and sentences in order to prevent the increase of receiver gain at such time and the production of high level background noise. A slow decay of the AGC control can be accomplished by having a long decay time for the integrator network in the AGC system, however use of a long RC time constant for this network may be undesirable in this instance because of the initial rapid decay in the discharge curve of such a network which can only be overcome by having a very, very long discharge time. When the decay time becomes too long, the receiver gain may not be recovered rapidly enough after the end of a reception period and the versatility of the receiver in the entire system may suffer. For example, the initial portion of signal information from an additional transmitter may be lost because the receiver gain has not been properly restored to a sufficient level when a second message closely follows a first message.

It is an object of this invention to overcome the above-described deficiencies and provide a practical AGC system which can properly follow the sideband information of a suppressed carrier signal.

Another object is to provide an AGC system responsive to a modulation signal and adapted to hold constant a system gain for a predetermined time between gaps in the signal, for example, between words or sentences in a voice modulated signal.

Another object is to provide an improved, transistorized automatic gain control system which is reliable in operation and which develops an amplified gain control potential suitable for control of a receiver of suppressed carrier single sideband signals.

A feature of the invention is the provision of an AGC system having a relatively short time constant integrator network for initiating response of the control system and a long time constant integrator network, which is also signal controlled, for maintaining an established gain after initiation thereof by the short time constant integrator network.

Another feature is the provision of such an AGC system which includes a switching circuit for disabling the slow time constant integrator network a predetermined time, for example one second, after the cessation of a single sideband signal in order to prevent increase of system gain at such time and development of noise, and further insuring rapid response of the system to a signal subsequently applied thereto.

Figure 2:
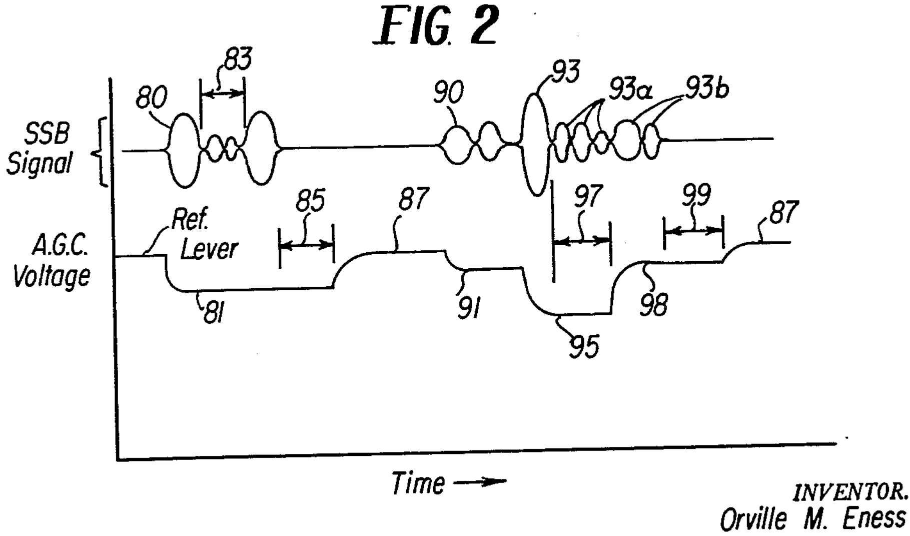

In the drawings:

FIG. 1 is a diagram partly in block and partly schematic, showing a radio receiver incorporating the invention; and FIG. 2 is a graph showing the response of the gain control system to a representation of suppressed carrier single sideband signals to illustrate the system operation.

In a particular form the automatic gain control system of the invention provides a step-type control which remains at a given control level for a predetermined period of time and then rapidly decreases to a reference or zero signal level. If the amplitude of the sideband signal increases while the control is at any given step level, the gain control level then rapidly increases to a corresponding new level to establish a new gain level. The system includes a signal detector having a relatively short time constant integrator network to respond rapidly to the appearance of signal components and to develop a potential representative of the detected signal level to be applied through a suitable driver stage to signal translating amplifier stages of the system as an adjustable bias for amplifying valves therein. A long time constant integrator network is also charged in response to the signal, although this takes somewhat longer, and after this network is charged and during continuation of the level of the received signal component, a constant gain control potential is developed by this network also. Upon cessation of the signal component, for example between words in a suppressed carrier system, and if it existed more than instantaneously as in the case of noise pulses, the short time constant network discharges immediately but the long time constant network maintains the previously established gain level. Also upon cessation of the signal component an RC timed switch circuit is rendered operative and if the translated signal does not reappear within a predetermined time, for example, ¾–1½ seconds, the switch circuit rapidly discharges the long time constant integrator network to re-establish a no signal gain level in the translating system. If the level of translated signal components should increase beyond a previous level, the short time constant network rapidly establishes a new gain control level and the long time constant network immediately thereafter also maintains this new gain level and does so for the same predetermined time after the signal decreases or ceases entirely.

FIG. 1 shows a receiver for suppressed carrier single sideband signals and the transistorized automatic gain control system for the receiver. The antenna 10 is connected to the radio frequency amplifier 12 from which the amplified and selected signals are applied to the mixer stage 14. An oscillator 16 also applies signals to the mixer 14 to produce a signal of fixed intermediate frequency which is then applied successively to the intermediate frequency amplifier stages 17, 18 and 19. If amplifier 19 is connected to the detector 21 in order that the signal may be demodulated. An oscillator circuit 23 is also connected to the detector 21 to provide a signal for reinserting the suppressed carrier for proper operation of the detector circuit. It will be understood by those skilled in the art that various specific forms of a suitable detector circuit may be used depending upon considerations in an overall communication system of this type. One desirable characteristic of the detector 21 would be that it provides peak limiting of the signal during the initial portion of any signal component in order to prevent overdrive and distortion during the time that the automatic gain control system is becoming effective. The demodulated audio signal from detector 21 is applied to a suitable audio frequency amplifier 25 and from there to a loudspeaker 26 or other utilization device for the received signal.

In accordance with known practices in 2-way communication receivers of the general type under consideration, an automatic gain control potential is applied to lead 30 which is connected to the RF amplifier 12 and the IF amplifiers 17 and 18. This control potential will vary with the level of a received signal, as will be more fully explained subsequently, to provide amplification or gain in these receiver stages which is inversely related to the signal strength in order to maintain a more nearly constant output from the receiver despite variations in received signal strength. Normally this gain control is effective by regulating the bias of the amplifier tubes or transistors in the receiver stages.

The output of the second IF amplifier 18 is also connected to a further IF amplifier 32 the output of which appears in the primary winding of the tuned transformer 34. One terminal of the secondary winding of transformer 34 is connected to a reference point or ground and the other terminal thereof is coupled to the cathode of the detector diode 36. The anode of diode 36 is coupled to ground through a parallel combination of the capacitor 37 and resistor 38. The capacitor 37 and resistor 38 form a fast time constant integrator network.

The junction of integrator network 37, 38 and diode 36 is connected to the base of R-C driver transistor 40. The collector of transistor 40 is connected to a suitable source of direct current potential negative with respect to ground. The emitter of transistor 40 is coupled through the diode 42, which is poled to permit conduction in the emitter-collector circuit of this transistor, and the load resistor 44 to ground. Resistor 44 provides an output impedance for transistor 40 so that this transistor operates as an emitter follower circuit.

The junction of diode 42 and resistor 44 is connected to the base of AGC driver transistor 46. The collector of transistor 46 is connected to the negative potential source and the emitter thereof is connected through the resistor 47 to ground. Resistor 47 also provides an output load impedance for transistor 46, which transistor thus operates as an emitter follower. There will also be further resistors connected between the emitter and ground in circuits 12, 17 and 18. The emitter of transistor 46 is connected to AGC lead 30 to provide the gain control potential for the receiver as previously described. Accordingly, it may be seen that this gain control potential is developed across resistor 47 as a voltage which is negative with respect to ground. The emitter of transistor 46 is also connected to the arm of the gain control potentiometer 49 and one fixed terminal of this potentiometer is coupled through resistor 51 to the source of negative direct current potential. Accordingly, by adjustment of potentiometer 49 a zero signal or reference gain control potential can be established on lead 30 due to the voltage divider action of resistor 47, potentiometer 49 and resistor 51, as these are coupled across the negative potential source.

The emitter of transistor 40 is also coupled through resistor 55 to the base of isolator transistor 56. The collector of transistor 56 is connected to the negative potential source and the emitter thereof is connected to the base of transistor 46. Accordingly, resistor 44 provides an output load impedance for transistor 56. A capacitor 58 is connected from the base of transistor 56 to ground. Resistor 55 and capacitor 58 form a long time constant integrator network which is charged by means of the signal appearing at the emitter of transistor 40. Networks 55, 58 control the transistor 56 which in turn controls the conduction of transistor 46 as will be described in further detail subsequently.

A diode 60 is connected from the base of transistor 40 to the arm of potentiometer 49. This diode is poled with its anode connected to the base of transistor 40 thereby effectively preventing the potential across resistor 38 from dropping below the absolute value equal to the potential developed across resistor 47. This potential will vary as potentiometer 49 is varied and will establish a level to which the detected signal across resistor 38 must rise before a signal responsive gain control signal will be developed. Furthermore, this network will prevent capacitor 58 from discharging to zero potential and changing the starting reference for the long time constant integrator network consisting of capacitor 58 and resistor 55.

Considering now the time delayed switching circuit for the long time constant integrator networks 55, 58, the base of discharge control transistor 62 is connected through resistor 64 to the base of transistor 40. The emitter of transistor 62 is connected to the arm of potentiometer 49 and the collector thereof is connected through the resistor 66 to the negative potential source. The potentials on the electrodes of transistor 62 are such that this transistor is normally cutoff in the absence of a signal but is rendered conductive when a signal is detected by the AGC detector 36–38. A capacitor 68 is connected between the collector of transistor 62 and the emitter thereof. Accordingly, this capacitor is discharged through transistor 62 when this transistor is rendered conductive and is permitted to charge through resistor 66 when transistor 62 is cutoff.

The collector of transistor 62 is connected through the zener diode 70 to the base of discharge control transistor 72. Zener diode 70 is poled with its anode connected to the collector of transistor 62. Thus, the potential across capacitor 68 must reach a predetermined value before diode 70 will be conductive to apply a control potential to the base of transistor 72. The emitter of transistor 72 is connected to the emitter of transistor 62 and the collector thereof is connected through a resistor 74 to the junction of resistor 55 and capacitor 58. Accordingly, when transistor 72 is conductive, it provides a discharge path for capacitor 58 through the resistor 74 to the reference potential point established at the arm of potentiometer 49.

Considering now the operation of the system, it may be seen that received signal components or sidebands representing modulation information will be detected in the detector circuit 36–38 to develop a potential at the base of RC driver transistor 40. The voltage at the base of transistor 40, negative with respect to ground, will control the conduction of this transistor to establish a related potential across the resistor 44 in the emitter circuit thereof. This potential is applied to the base of transistor 46 to establish a conduction of this transistor which provides the initial gain control signal across its emitter resistor 47. The emitter of transistor 40 is also connected to the long time constant integrator network comprised of resistor 55 and capacitor 58, which capacitor becomes charged to the potential developed across resistor 44 a short time after the AGC level has been established by the short time constant neworks 37, 38. As capacitor 58 comes up to charge, the isolator transistor 56 increases its conduction through the resistor 44 to thereby establish a conduction of AGC driver transistor 46 by means of long time constant network 55, 58. Thus it may be seen that diode 42 provides a current path for the transistor 40 as it forms the means providing the fast attack or rapid response of the AGC control. Furthermore, diode 42 is poled so that it will prevent discharge of capacitor 58 through the resistor 55 and the base circuit of transistor 46. Accordingly, by means of the diode 42 and the isolator transistor 46, the short time constant networks 37, 38 and the long time constants 55, 58 may both be operative in the system to control the conduction of the driver transistor 46 without interference between the two integrator networks.

As previously indicated the transistor 62 is normally biased to cutoff under no signal conditions. With transistor 62 cutoff, capacitor 68 will be charged through resistor 66 to apply a potential through zener diode 70 to the base of transistor 72 to maintain this transistor in conduction. With transistor 72 in conduction a low impedance path is established across capacitor 58. However, as soon as sideband signal components are detected by the system in the detector 36–38, a negative voltage is applied to the base of transistor 62 making it conduct and immediately discharging capacitor 68 through the emitter collector thereof. With capacitor 68 discharged the potential at the base of transistor 72 is raised sufficiently to cut off this transistor and open circuit the low impedance discharge path which had existed across capacitor 58. Accordingly, with the discharge control transistor 72 cutoff the long time constant integrator networks 55, 58 may be charged as previously described through the emitter circuit of RC driver transistor 40.

Considering now the time when sideband signal components disappear, for example, when there is a gap in the signal between words or at the end of any particular signal transmission, it will be observed that the capacitor 37 is rapidly discharged but that the capacitor 58 of the long time constant integrator network will discharge very slowly. At such time the potential of the base of discharge control transistor 62 will rise cutting off this transistor and permitting capacitor 68 to charge through resistor 66. Upon sufficient charge of capacitor 68, zener diode 70 will be rendered conductive in a reverse direction to permit conduction of the discharge control transistor 72. This will again place the low impedance discharge path of resistor 74, the collector emitter of transistor 72 and resistor 47 across the capacitor 58 for rapid discharge thereof. This condition will, of course, establish a conduction condition of transistor 56 and transistor 40 which is associated with a no signal condition so that the conduction of the AGC driver transistor 46 is returned to normal, or a no signal level to establish the maximum gain in the receiver.

In a system of practical construction operative as previously described, circuit component values were as follows:

| | |
|---|---|
| Diodes 36 and 60 (germanium) | HD2149. |
| Capacitor 37 | 6 mfd. |
| Resistor 38 | 22,000 ohms. |
| Transistors 40, 46, 56, 62 and 72 | 2N652. |
| Diode 42 (silicon) | HD6001. |
| Resistor 44 | 39,000 ohms. |
| Resistor 47 | 390 ohms. |
| Potentiometer 49 | 5,000 ohms. |
| Resistor 51 | 1,000 ohms. |
| Resistor 55 | 1,000 ohms. |
| Capacitor 58 | 200 mfd. |
| Resistor 64 | 15,000 ohms. |
| Resistor 66 | 82,000 ohms. |
| Capacitor 68 | 15 mfd. |
| Diode 70 (Zener) | SV125. |
| Resistor 74 | 470 ohms. |

It may be seen that the AGC system of the invention provides a fast attack or response as a received signal increases in amplitude and that it includes a delay in the decrease of the gain control level when the received signal amplitude is decreased. FIG. 2 is a representation of the operation of the system to graphically illustrate what takes place in the gain control potential that is produced in response to different types of signal variations. The upper curve in this figure represents a modulation envelope of a suppressed carrier single sideband signal showing signal components as "bursts" of radio frequency energy having different durations and different amplitudes and different time spacings between these bursts. Such a signal might be produced in a two-way communication system by using voice signals spoken as persons often do so that there are gaps or no signal conditions established between sentences or words or even between syllables of the same word under some conditions. The second curve in FIG. 2 represents the variation in the gain control potential at lead 30 in FIG. 1, in response to the illustrated single sideband signal. The AGC voltage varies in a negative direction from a reference potential level established under no signal conditions. Both curves are plotted against time.

In FIG. 2 when the signal represented by modulation envelope 80 commences it will be seen that the AGC voltage immediately is established at a level 81 corresponding to the amplitude of the initial portion of the envelope 80. When the modulation envelope decreases in amplitude in the time region 83 the AGC level 81 remains constant since the time 83 is less than the time required for the discharge control transistor 72 to be discharged or to disable the long time constant integrator network 55, 58. Furthermore, it will be observed that the AGC level 81 is maintained for a time 85 after the cessation of the modulation envelope 80. This is the time during which it takes capacitor 68 to charge sufficiently to render discharge control transistor 72 conductive for the purpose of discharging the long time constant integrator network (capacitor 58). However, when this operation does occur, the AGC voltage returns to the reference level shown at 87. The modulation envelope 90 being of lesser amplitude than the initial portion of the envelope 80, establishes a gain level 91 which is less negative than the gain level 81. The envelope 93 represents an increase in signal amplitude which is immediately reflected in the AGC level due to the rapid response of the short time constant detector circuit 36–38 to establish a gain level 95. While the modulation envelope decreases in amplitude at portions 93*a*, the gain level 95 is maintained for a predetermined time 97 which is equal to the same time as time 85. However, after the elapse of time 97 the AGC control potential is then established at a level 98 which is representative of the amplitude of the modulation envelope 93*b*. When the envelope 93*b* ceases the AGC potential returns to the reference level 87 after a time period 99 which is equal to the time period 97.

The time periods 85, 97 and 99 are all equal and in a practical system may be equal to about one second. Other time periods may also be used, for example three-quarters of a second or even one and one-half seconds. If this time period is made too short then there will be blasts of noise from the receiver between words, for example, when these are spoken with a spacing which exceeds that time period. If the time is made much greater than suggested herein then the initial portion of a transmission from a different station which transmits a weaker signal may be translated in the receiver below a desired gain level since the receiver had not sufficient time to re-establish its no signal gain level.

It may also be noted that the system is relatively immune to "setting up" on random noise bursts. This is because of the delay in response of the long time constant integrating network 55, 58. That is the short time constant network may respond to a noise pulse but if the pulse ends before the long time constant network becomes charged, then the short time constant network may rapidly discharge and the noise will have but little effect on the system.

This invention provides, therefore, a gain control system which may be used with a signal translating amplifier which is found in a suppressed carrier single sideband receiver in order to provide automatic gain control in the absence of a fixed carrier generally used in other types of communications system. It may be seen that the present gain control system will respond rapidly to signal level increases for proper adjustment of the receiver gain level and then will maintain the desired gain level automatically for a time sufficient to insure receiver operation without undue noise during signal gaps but yet will still maintain a high degree of intelligibility of all signals received by the particular receiver which is gain controlled.

I claim:

1. A signal translating system having a gain level therein dependent upon the level and duration of a translated signal, including in combination, a gain establishing circuit connected to said signal translating system for establishing the gain thereof in response to a direct current control potential, a detector circuit including a short time constant integrating network rapidly responsive to a change in level of a translated signal in said system, said detector circuit being connected to said gain establishing circuit to provide a control potential for establishing the gain level upon initial increase in the signal level, a long time constant integrating network connected to said detector circuit and said gain establishing circuit to provide a control potential for maintaining the gain level established by said detector circuit, a first transistor controlled by said detector circuit, a resistor-capacitor timing network controlled by said first transistor, a second transistor connected in circuit with said long time constant integrating circuit and controlled by said resistor-capacitor timing network to provide a charge changing path for said long time constant integrating network upon the absence of a signal in said detector circuit and after a predetermined time established by said resistor-capacitor timing network.

2. In means for translating suppressed carrier signals, an automatic gain control system including in combination, a detector circuit having a short time constant integrating network for detecting the signals, a first transistor having the conduction thereof controlled by said detector circuit, gain control circuit means including a second transistor having the conduction thereof controlled by said first transistor, a third transistor coupled to said second transistor for controlling the conduction of said second transistor, a long time constant integrating network coupled between said first and third transistors, time delay switch means connected to said long time constant network to provide and momentarily maintain, after reduction in level of the signals, a gain control level as initially determined by said short time constant integrating network.

3. In means for translating suppressed carrier signals, an automatic gain control system including in combination, a detector circuit having a short time constant integrating network for detecting the signals, a first transistor having the conduction thereof controlled by said detector circuit, gain control circuit means including a second transistor having the conduction thereof controlled by said first transistor, a third transistor coupled to said second transistor for controlling the conduction of said second transistor, a long time constant integrating network coupled between said first and third transistors to maintain after the cessation of the signals a gain control level as initially determined by said short time constant integrating network, and time delayed switch means controlled by said detector circuit and coupled to said long time constant integrating network to provide a charge changing path therefore for a predetermined time after the cessation of signals.

4. In means for translating a suppressed carrier signal, an automatic gain control system including in combination, a detector circuit having a short time constant integrating network for detecting the signals, a first transistor having an input electrode connected to said detector circuit and further having an output electrode, a diode and first load resistor means connected in series to said output electrode, a long time constant integrating network connected to said output electrode to be controlled therethrough by said detector circuit, gain control circuit means including a second transistor having an input electrode connected to said first resistor means and further having an output electrode, second load resistor means connected to said output electrode to provide a gain control potential for said system, a third transistor having an input electrode connected to said long time constant integrating network and an output electrode connected to said first resistor means for isolating said long time constant integrating network from said second transistor, and delayed switch means including further transistor means and a resistor-capacitor timing network controlled by said detector circuit and coupled to said long time constant integrating network to provide a charge changing path therefor upon cessation of signals and delayed operation of said switch means whereby an established gain control level is maintained for the delay period after cessation of a signal.

5. A signal translating system having its gain level controlled by the level and duration of a translated signal, including in combination, a gain establishing circuit connected to said signal translating system and applying a direct current control potential thereto for establishing the gain thereof, a detector circuit coupled to said translating system and including a first integrating network having a relatively short time constant rapidly responsive to a change in level of a translated signal therein, first means connecting said detector circuit to said gain establishing circut to provide a first control potential therefor to establish the gain level of said translating system upon the initial increase in the level of the translated signal, a second integrating network connected to said detector circuit including a first charging path having a long time constant, second means connecting said second integrating network to said gain establishing circuit to provide a second control potential therefor to maintain the gain level of said translating signal established by said detector circuit, means forming a second charging path for said second integrating network having a short time constant, and time delayed switch means connected to said detector circuit and responsive to said first control potential to connect said second charging path to said second integrating network a fixed time after the reduction of the level of the translated signal, so that said second integrating network produces a control potential to establish a different gain level associated with the level of a signal in said system.

6. In a suppressed carrier signal translating system, a gain control circuit, including in combination, a gain establishing circuit connected to said signal translating system and applying a direct current control potential thereto for establishing the gain thereof, a detector circuit coupled to said translating system and including a relatively short time constant first integrating network rapidly responsive to a change in level of a translated signal, said detector circuit being connected to said gain establishing circuit to provide a first control potential therefor to establish the gain level upon an initial increase in the signal level, a second integrating network connected to said detector circuit and having a first charging path with a long time constant to provide a second control potential for maintaining the gain level established by said detector circuit, isolating means coupling said second integrating network to said gain establishing circuit, means forming a second charging path having a short time constant, and time delayed switch means for connecting said second charging path to said second integrating network, said switch means being connected to said detector circuit and responsive to said first control potential to provide a charging path of short time constant for said second integrating network a predetermined time after the reduction in level of a signal in said detector circuit, to thereby permit said second integrating network to continue an established gain level for the predetermined time after the reduction in level of a signal in said system.

References Cited in the file of this patent

UNITED STATES PATENTS

| | | |
|---|---|---|
| 2,515,196 | Coe | July 18, 1950 |

FOREIGN PATENTS

| | | |
|---|---|---|
| 447,405 | Canada | Mar. 23, 1948 |
| 807,780 | Great Britain | Jan. 21, 1959 |